Patented Oct. 14, 1947

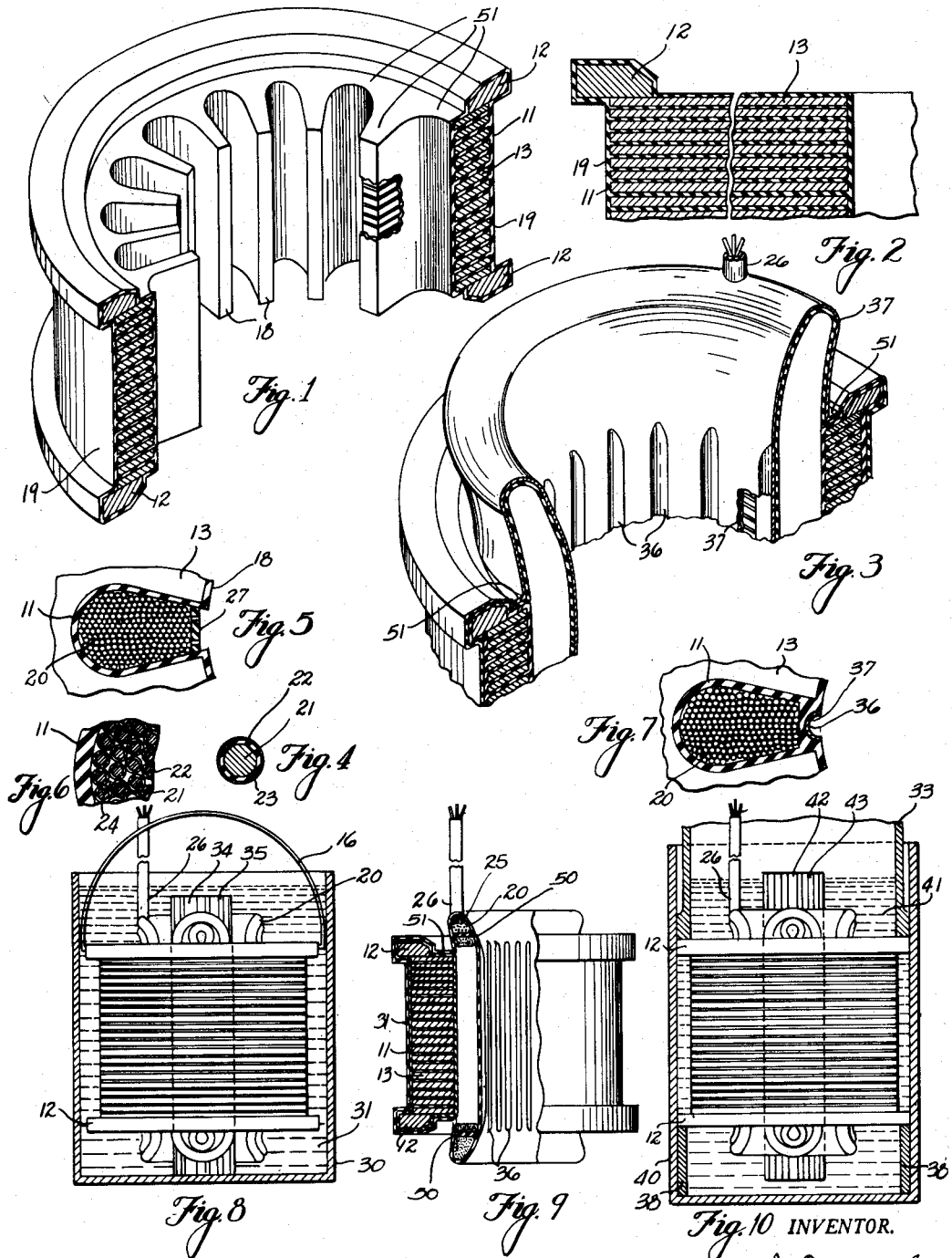

2,428,816

UNITED STATES PATENT OFFICE 2,428,816

WATERPROOF WINDING ELEMENT

Frank J. Sigmund and William S. Hlavin, Cleveland, Ohio, assignors, by mesne assignments, to Sigmund Corporation, a corporation of Ohio Application April 29, 1943, Serial No. 485,020

3 Claims. (Cl. 171—252)

Our invention relates in general to making the winding elements of a dynamo-electric machine vibration, dust and moisture-proof and more particularly to making it water-tight so that it may be operated in water.

Of interest in connection with this application is the copending application of Frank J. Sigmund and William S. Hlavin, filed April 12, 1943, Serial No. 482,710, for Magnetizable core.

A great deal of difficulty has been experienced in mounting the windings in the coil slots of dynamo-electric machines so that the windings would be insulation-proof against high voltage and at the same time be protected from moisture, dust, vibration and abrasive wear. In the prior art the sharp edges of the laminations which comprise the core would cut the paper insulation sheets in the slots, the paper fibre insulation sheets also having sharp edges could cut the insulation on the conductors themselves, especially when the enameled wires are stretched. This skinning or cutting of the insulation was particularly true where the motor was operated at high speed and had excessive vibration. Observations show that the paper, cambric, or fibrous material which is used as the slot lining and paper insulation between the coils are unsuitable, as the coil separator and the wedges contain many impurities and in addition readily absorb water. It appears that the presence of the paper or other fibrous insulating material which comprises the slot sleeves, winding separators, wedges in the winding elements of the dynamo-electric machines in combination with the small cracks or crevices between the laminations and pores in the insulation, especially when some unhomogenous material is used, function to produce a "wick" action, in that a capillary action is set up which tends to draw moisture through the small cracks between the outside surface of the motor to the paper based insulation slot sheets, separator, wedges and like parts. This action is continuously present, so that over a longer period, the paper or other fibrous insulation becomes deteriorated, the resistance lessened and serious breakdown may occur. Test observations show that the resistance to ground varies quickly with changes in moisture conditions surrounding the dynamo-electric machine. Thus the resistance to ground changes fairly quickly with corresponding changes in weather conditions, especially when the motor remains idle for a relatively long period of time. Further observations reveal that cracks and distortion occur quickly when the dynamo-electric machines are subjected to large temperature differences ranging from substantially 50 to 70 degrees below zero to high room temperature conditions.

When cracks appear the absorption of moisture is accelerated as well as the tendency toward abrasion. Paper and other insulation separators, wedges, for instance of fibrous material, even when they are as dry as they can practicably be, are none too good as an insulator, because they may then contain as much as 5 to 10 per cent moisture. When they absorb an additional amount of moisture resulting from damp conditions, the insulating properties materially decrease. Furthermore, the paper swells and causes defects to appear. These disadvantages have been known for many years but have not been successfully overcome.

Another objection to paper based wedges and insulation separators in the windings of the dynamo-electric machines is that when the windings are placed in the slots, there exist air pockets or air spaces between the windings and the inserted wedge and between the wedge and the varnish or other closure of the slot. The same air pockets, moreover, are hardly removable from insulation separators. The wedges are relatively stiff and the windings may likewise be relatively stiff with the result that there is not a perfect meeting or contact between the windings and the wedges which decreases the heat conductivity and accordingly lowers the heat dissipation from the windings over to the rotor hole. The presence of the air spaces between the windings and the wedges and between the wedges and the closure of the slots sets up a condition where oxidation may readily occur, which over a long period of operation may destroy the insulation about the winding. The same objections and difficulties are found with regard to the use of the winding spacers or separators. In case of high voltage windings, the presence of the air pockets or spaces leads to further complications in that the walls of the wedges and separators are over-stressed so that they glow and active electrical discharges may occur. Breakdown of the insulation in the dynamo-electric machines is accelerated by the described conditions and also by its thermo and electric instability. The insulation materials of the known dynamo-electric machines are composed of various components having paper or fibrous bases and have different heat conductivities and different dielectric strengths, resulting in the establishment of different heat zones, thus causing electrical and mechanical stresses within the different layers involved.

It was also found that the prior art or method of varnishing or impregnating the winding, especially when lamination cores are involved with small slots, is not satisfactory, and as the material does not penetrate through the entire slots, particularly when the winding is packed very tightly, even when more immersion of the lamination core is employed. The result is hardly better as the first deposit covers the entrance in the slots and does not allow the free flow of the next insulation step.

In the prior art it was very difficult to completely remove the vibration between the individual wires as it was impossible to make the bond between the wires, to make them a solid vibration-proof mass. Furthermore, it was impossible to create a perfect bond with the insulation sleeves in the slots and the winding, as well as with the wedges. A great deal of difficulty was encountered in removing completely the trapped air between the individual wires and between the coil division inserts or separators. Besides that, the varnishing procedure for the purpose of tightening the wires had to use a high temperature to cause the insulating material (varnish) to cure or harden. This high temperature caused the embrittlement or other injury of the windings. This inadequacy of the prior art of the varnishing methods is of a more serious nature if the motors with high voltages are employed, as the varnish does not protect and envelop the whole surface of the windings and glowing occurs which, in connection with the trapped air, causes a quick ionization.

The prior art of insulation of the dynamo-electric machines used up till now does not give a homogeneous coating. The varnish did not totally penetrate through the slots. Thus, serious consequences resulted when such machines, especially of the high voltage type, were exposed to high humidity, chemically corrosive fumes, and so forth. The air which never could be completely removed from the insulation created air pockets, bubbled and expanded and was driven out when the machines were running (at a higher temperature), thus creating a partial void and causing a quick stream of the chemically or moisture-saturated air in the area to which the motor is exposed when the motor is not in operation.

The observation was made that the motor so exposed has lower resistance to ground, and frequent drying out must take place in order to prevent the motor from becoming seriously damaged.

The inadequacy of the prior art of covering the winding of the dynamo-electric machines with molded plastics, for instance Bakelite, is well-known. The cracks resulting in the serious damaging of the insulation are well known to everyone familiar with the art. The different coefficients of expansion of the lamination core and the Bakelite insulation mass creates rather big free space between the lamination core when the dynamo-electric machine is fully loaded (running hot).

The different wedges, slot insulation sleeves, coil separators, and other means used in the prior art when the motor was covered with plastic molded covers having different coefficients of expansion and different thermal conductivity, resulted in different heat spheres and caused serious damage to the dynamo-electric machines.

The prior art covering of the top and bottom heads of the windings, which as it comes from the winding procedure is of an irregular or uneven shape, and consequently required a rather heavy coating in spots and a thin coating in other spots to cover all those irregular shapes. The mold had to be made rather precise and cylindrical in shape so that it will cover the irregular shape of the winding, thus resulting in the very thick sections of a very poor conductive Bakelite-like covering. The heat cannot be dissipated readily and the unequal heat between the thick and thin sections causes immediate cracks and serious damaging of the dynamo-electric machine.

Beside these disadvantages, the molding pressure required by the Bakelite-like materials was rather excessive, thus damaging the windings and making the operation very expensive.

Difficulties were encountered when the dynamo-electric machine was operated in water. Even when the motor was unusually well protected by good insulation, the insulation around the wedges, being exposed to the turbulent stream of water, was washed out.

Some damage occurred frequently on the thin sections of the top and bottom covers of the windings as the surface was rather soft and was exposed to the mechanical injuries.

An object of our invention is to obviate all of the hereinbefore mentioned defects.

A more specific object of our invention is to provide for eliminating capillary action between the laminations of the stator core and between the lamination core and the top and bottom heads of the winding, the wedges and other parts.

Another object of our invention is to cover or coat the surface of the slots of the lamination core with a rubber-like material to eliminate the air pockets on one side, and to cover the top and bottom heads of the winding, the free spaces between the winding on the other side, and to form complete vibration and water-proof elements.

Another object of our invention is to provide for sealing the laminations together with respect to each other by means of rubber-like material to seal the spaces between the laminations against capillary action, and for applying a coating of the rubber-like material upon the surface of the slots in which the coating of the rubber-like material in the slots is anchored to the rubber-like material between the laminations on one side, and to seal the spaces between the wires, top and bottom of the coils on the other hand, with rubber-like material to render them vibration and water-proof.

Another object of our invention is to coat the entire magnetizable core, wires, and windings, winding leads and cables with a rubber-like material.

Another object of our invention is to dispense with the requirement of using slot sleeves, varnish, winding separators, and wedges, which may be made of paper, fiber, or other insulation sheets, by employing rubber-like material instead.

Another object of our invention is to prevent the corners of the laminations, wedges, and winding separators from cutting or otherwise damaging the insulation about the wires.

Another object of our invention is the provision of a covering in the slots and about the lamination and the filling up of all free spaces between the individual wires, the top and bottom of the coils, so as to absorb vibration shocks which would otherwise be imparted to the windings.

Another object of our invention is the provision of a coating or covering in the slots into which the wires may be somewhat imbedded so that there are substantially no air spaces between the individual wires, winding separators, and filling the spaces with the result that the heat dissipation and the dielectric strengths are maintained as high as possible.

Still another object of the invention is to imbed the windings of the coils in soft rubber-like material and to cover the soft material with a harder material of the same rubber-like material which completely adheres thereto without entrapped air pockets.

Another object of our invention is to cover the lamination core, the individual wires, windings with the homogeneous rubber-like material maintaining the same power factor, thus keeping the thermo-electrical spheres equal.

Another object of our invention is to use first a rubber-like under coated lamination core which may contain a powdered mica, asbestos, or other suitable insulating material and then to insert the windings and apply outside coating of substantially pure rubber-like material, and the outside coating forming a good water-tight seal to prevent any moisture from being absorbed by the powdered mica, asbestos, or similar material.

An object of our invention is the provision of employing a rubber-like material for making the windings of a dynamo-electric machine watertight.

Another object of our invention is to provide a dynamo-electric machine which will operate exposed to moisture, dust and chemicals.

A further object of our invention is to provide an efficient method of anchoring the dynamo-electric conductors firmly in the slots and to provide new space-covered coating on the conductors.

Another object of our invention is to imbed the winding elements in plastic-tight enclosures which cause the wires of the coils to adhere together and creating impenetrable enclosure.

A further object of our invention is the sealing of the cable to the protective cover of the motors.

Another object of our invention is the employment of new means to create the homogeneous bond between the windings and the rubber-like envelope slot sleeves and the bond between the winding.

Another object of the invention is the provision of cooling ducts in the lamination core.

A further object of our invention is the covering of the rubber-like surfaces of the slots as well as the bottom and top heads of the coils with a metallic protection.

Another object of the invention is the method of depositing the shock-proof insulation throughout the entire slots, thereby driving all the air out and making the varnishing unnecessary.

Another object of our invention is to provide for covering the outside of the rubber-like coating with a metal which may be preferably applied by spraying or any other suitable means.

Another object of our invention is to keep the rubber-like material from running or flowing at high temperatures by covering the rubber-like material with metal such as by spraying.

Another object of our invention is to provide grooves in the rubber-like material where it bridges the gap between the teeth which increase the heat radiating surfaces of the lamination core.

Other objects and a fuller understanding of our invention may be had by referring to the following description and claims, taken in conjunction with the accompanying drawing, in which:

Figure 1 shows a cross-sectional view of a stator embodying the features of our invention;

Figure 2 is an enlarged fragmentary view of a cross-section of the laminated core and shows particularly the deposition of the rubber-like material between the laminations;

Figure 3 shows a lamination core with a rubber-like coating for the inserted windings which are omitted for purposes of clarity;

Figure 4 is an enlarged cross-sectional view of an individual wire covered with rubber-like material;

Figure 5 is a cross-sectional view through the slot, employing the means of our invention;

Figure 6 shows a fragmentary and enlarged cross-sectional view through the slot, showing the individual wires forming a bond between the wires and the rubber-like sleeves;

Figure 7 is a cross-sectional view similar to Figure 4, showing the secondary deposits on the lamination teeth;

Figure 8 shows a container having a rubber-like solution and means for employing the rubber-like material throughout the slots and on the entire surface of the dynamo-electric machines;

Figure 9 shows a deposit formed on the leads and bond between the leads and the cable covered with the rubber-like material; and Figure 10 is a cross-sectional view of a dipping tank showing the dynamo-electric machine with the rubber-like deposition thereon.

In this application and throughout the claims, the term "dynamo-electric machine" will be understood to include both the rotor and the stator.

With reference to Figure 1 of the drawing, the core 10 may comprise a stack of laminations 13 and end rings 12 suitably held together in any well-known manner. As illustrated, the entire surface of the magnetizable core 10 and the rings 12 are covered with a rubber-like material 11. In our invention, the rubber-like material includes a variety of substances in which the predominating resinous component may comprise polymers of vinyl compounds, such as vinyl chloride, vinyl acetate, vinyl acetals and alcohols, and vinylidene chloride. It may further include mixtures and copolymers of the vinyl compounds either with or without substantial amounts of plasticizers usable with these resins. Natural rubber or synthetic rubber may be employed.

We find that the compounds identified above give very good results, however, we do not want to be specifically confined to these compounds as our invention contemplates the use of any rubber-like material or synthetic rubber-like compound with distinctive qualities which make that compound the most suitable for the insulation such as: (1) low water absorption, (2) high electrical resistance, (3) great resistance to chemicals including acids, alkalies, corrosives and gases, (4) good tensile strength, and (5) easy to apply to the magnetizable core.

The softening point of the rubber-like material should be as high as possible, thus permitting the temperature of the motor to rise to a high value. The rubber-like plastics or their compounds have a wide range of temperature resistance and point of softening. Some begin to soften at 140° F. or more. Other grades can be employed with a softening temperature higher than 200° F. and do not become brittle at sub-zero temperatures and which have high dielectric and high tensile strengths.

As shown in Figure 2, the rubber-like material 11 is applied between the laminations 13. In practice every other one of the laminations may be dipped in a rubber-like material so that when they are all stacked the rubber-like material appears between each lamination. As an alternative the sheets may be sprayed. The stacked core may be pressed together very tightly to squeeze out any excess rubber-like material, with the result that a very thin layer of rubber-like material 13 is present between the laminations. The stacked core may be heated to set the rubber-like material between the laminations. The heating may be done either by electrical induction or by placing the stacked laminations in a suitable drying oven or the like. After the rubber-like material between the laminations is set or dry, the next operation is to apply the rubber-like coating 11 to the outside of the core. In practice, we find that this may be done by dipping the entire magnetizable core 10 into a container 30 (see Figure 8) having a supply of rubber-like material 31. As illustrated in Figure 8, a bale 16 or other handle may be connected to the magnetizable core to facilitate the dipping. The outside coating 11 also may be applied by spraying or brushing. In order to limit the thickness of the coating 11 upon the teeth 18 and to prevent the coating from bridging the opening of the slots, we preferably employ a mandrel 34 which fits relatively tight within the stator opening which receives the rotor. As illustrated in Figure 8, the mandrel 34 may have longitudinal ribs 35 which project a short distance into the opening of the slots with large clearances to keep the coating 11 from bridging or extending across the space between the teeth 18. The mandrel 34 may be used for the first several dips, after which it may be removed for the final dips.

The thickness of the rubber-like coating 11 depends upon the purpose for which the dynamo-electric machine is to be used. If the machine is to be merely exposed to dust, atmospheric moisture or chemically corrosive fumes, the thickness of the coating need not be greater than the commonly used fish paper slot sleeves, namely about $\frac{1}{20}$ to $\frac{1}{30}$ of an inch thick. The thickness may be greater if complete water-proofing is desired. In that case, the thickness may be as much as from $\frac{1}{16}$ to $\frac{1}{10}$ of an inch. To obtain a thickness of $\frac{1}{10}$ of an inch it may require as many as five or six dippings. For best practice, the coating may be permitted to dry in air for about thirty minutes between each dipping and then after all of the dippings are made the complete stator with the coating thereabout may be dried by any suitable heating method, such for example, as by heating oven or the like.

After the material is baked the core is then ready for the insertion of the windings 20 in the coated slots, the coating of the rubber-like material 11 forming a water-tight coating and being somewhat flexible and will not crack or break incident to contractions and expansions of the laminations. The methods and steps so far described are substantially the same as shown and described in our copending application as mentioned above. The coating may also be exposed to a wide range of temperatures without cracking or permitting the moisture to pass therethrough. The coating may withstand temperatures as low as substantially 50° F. to 70° F. below zero and up to softening points.

The windings 20 are inserted in the coated slots and some cases are secured with a thin wedge 27 made of the rubber-like material. The wedge 27 has a plurality of openings, these permitting the free flow of the rubber-like material in and about the winding when subsequently dipped. In other cases, we prefer to tighten the windings in the lamination without any wedge at all using the rubber-like material and causing the material to adhere to the conductors and to the sleeve deposit 11 on the walls of the slots and bridging the space between the teeth 18, as shown in Figure 7.

As shown in Figure 4, each of the conductors 21 which collectively comprise the winding 20 may be covered with the rubber-like material 22, the outside of which may be further covered with rubber or other suitable protective material 23 forming a spacer on the wire.

Figure 5 pictures the assembled wires in a slot. When the wires are assembled in loops and inserted into the slots, even if they are closely pressed together a rather large free space remains filled with air, which must be completely filled up. That is a rather difficult procedure when the lamination slots are small and the lamination core long. Figure 6 is an enlarged fragmentary reproduction of Figure 5 and pictures the unfilled free spaces 24 which are to be filled with the rubber-like insulation.

We fill all of the free spaces 24 between the individual wires with a relatively thin solution of the rubber-like material. The method employed in filling these free spaces 24 is shown in Figure 10 wherein the rubber-like material 41 is contained in a cylindrical-like container 40 and the stator is disposed to fit closely within the container 40 to produce a piston-like effect. Within the rotor opening of the stator, we employ a mandrel 42 having longitudinal ribs 43 which extend a short distance into the opening of the slots to produce longitudinal grooves or ducts 36 around the inside surface of the stator. The stator with the windings positioned in the slots is pressed downwardly by means of dies 33. Stops 38 may be placed in the bottom of the container 40 to limit the downward movement of the stator so that the bottom heads of the windings do not contact the bottom of the container. The pressure created by the piston-like effect of the stator forces the thin solution of rubber-like material 41 into the free spaces 24 and completely drives out all of the air and permits the rubber-like material to penetrate around the covering 23 of the conductors. The cover 23 acts as spacers for the wires so that the solvent may separate the wires in the slots. The stator as shown in Figure 10 may be dipped or forced into the tank 40 several times, depending upon the thinness of the rubber-like material and upon the thickness of the coating required. The rubber-like solution 41 may be changed according to the necessity to drive the liquid through the relatively small spaces between the wires. The rubber-like material in this step of the procedure would contain a larger amount of plasticizer, such for example, as ethyl hexyl phthalate or any other suitable plasticizer to create a soft embedment for the wires. The thinness of the solution may be governed by the amount of solvent employed such as acetones or ketones. Between each dip of the stator into the thin solvent 41 in the tank 40, the rubber-like material may be allowed to air-dry for several minutes thus evaporating the volatile solvents. The mandrel 42 may be removed during the drying period. After the thorough penetration of the stator core and windings and after the solvent is evaporated, the core may be baked. The forcing of the thin rubber-like material between the wires anchored the wires together as well as to the rubber-like coating 11 in the slots, and no further vibration can occur. The use of the stator as a piston as shown in Figure 10 gives very good results causing the rubber-like material to be forced between the small openings and crevices between the wires and the slots. The piston-like effect gives very good results even for long stators. The mandrel 42 may be moved as a piston while the stator is held stationary. The thickness of the rubber-like spacer 23 on the conductors 21 is not heavier than thirty-thousandths to one ten-thousandth of an inch, depending upon the size of the dynamo-electric machine. The spacer may be wound on the conductor in the known way. Impregnation adheres tightly, anchoring the individual wires, creating a tough flexible insulation wall, and so creating the suitable insulation, even when high voltage is used. The insulation helps to make the windings moisture-proof.

Besides that the insulation wall between the individual wires is reinforced by means of the highly dielectric rubber-like material. This reinforcement of the walls is especially valuable when the dynamo-electric machines are used with high voltage.

The usually used varnishes are objectionable and do not adhere together with the windings, and do not tighten the wires completely, so that the vibration, even if not particularly marked, always occurs. Motors insulated according to our invention do not develop any vibration, and even when a single-phase current is employed to magnetize the lamination core, there is no vibration or noise apparent, but all other motors develop a noise, indicating that vibration does exist. The insulation forms a soft imbedding and the abrasion cannot possibly occur, and does not exist in the material according to our invention. More apparent is the advantage when the ends of the coils are covered, especially when high voltage is employed. Attempts were made to insulate the heads of the coils with tapes, and like material, but this does not prevent, for instance, electrical surface discharges, and even though not seen, these discharges and "glowing" are still existent under the tape. Our insulation penetrating between the individual wires completely eliminates the surface discharge and "glowing." This procedure of forcing the rubber-like material through the coils may be repeated until the bond between the wires forming the top and bottom heads of the coils, and between the separators, making a complete bond between the individual wires, and making the winding 20 in the lamination core ready for the further steps of our procedure which comprises covering the entire stator and windings with the thicker rubber-like material in the tank 30 of Figure 8. In this step the rubber-like material fills the rest of the free spaces in the slots, coats the top and bottom heads of the windings, and the leads 25 as well as the cable 26 which is connected to them.

The dipping may be made in the similar way as described before with reference to Figure 8. The bail 16 may be used to hold the lamination core in the desirable position; to cover the whole lamination evenly we shall reverse the lamination core from time to time. After a number of dips the whole core may be baked. Of course, after each dip the lamination core and the winding is dried in the air. During this step of the procedure a sufficient thickness of insulation is achieved to create a non-penetrable envelope. This material, it should be understood, could also be applied by brushing or spraying. This rubber-like material adheres completely to the previously employed cover 11 in the lamination slots and to the cover on the entire surface of the lamination core, and to the previously employed cover over the top and bottom of the windings. The thickness of this outside cover is determined by the use for which the motor is intended. If the machine is to be merely exposed to dust, atmospheric moisture or chemically corrosive fumes, the thickness of the coating need not be heavy, thus just creating a necessary cover which may be only $\frac{1}{20}$ of an inch thick. If complete waterproofing is desired the thickness may be about $\frac{1}{10}$ of an inch. To obtain a thickness of $\frac{1}{10}$ of an inch, as many as five or six dippings may be required.

The rubber-like solution employed in this step of our invention is usually composed of more rubber-like resin and less plasticizer such as, for example, ethyl hexyl phthalate. The drying step between the successive layers serves to evaporate the solvent such as acetone or ketone which may be used to vary the viscosity of the liquid.

Figure 7 pictures the deposit on the lamination teeth and the complete seal of the slot space. We would prefer to make a coating on the teeth 18 as thin as possible, but if the motor should be water-proof, we may deposit about a $\frac{1}{20}$-inch to $\frac{1}{10}$-inch thickness. This deposit on the teeth adheres with the deposit previously employed on the lamination core and extends throughout the entire slot. The surface of the rotor hole may be cleaned or machined by any suitable means to vary the thickness of the coating on the teeth 18. The original coating of the cable 26 is covered with similar rubber-like material. The stator with the windings and the connected leads 25 and cable 26 after they are covered with the rubber-like material of our process, are shown in Figure 9, giving a completely water-tight stator, including the leads and cable. The vertical portion of the windings enveloped by the rubber-like cover is not shown for the purpose of clarity. The thickness of the coating which covers the outside surface 19 of the core may also be made thin to enable the core to dissipate heat readily. The coating around the outside surface 19 may be made thin by machining or by employing wrapping or masking tape during the first several dippings after which the masking tape may be removed together with the rubber-like material deposited thereon, before finally baking the assembly in the oven.

In cases where the dynamo-electric machines will be submerged we would prefer to create the duct or grooves 36 for the circulation of the cooling water, as the clearance between the rotor and stator of the dynamo-electric machine should be as small as possible.

As the turbulent streams of the water due to the rotor action may, over a long period, wash out part of the insulation in the slots, a special cover 37 is employed to prevent such deterioration. Suitable metals such as zinc, cadmium or lead may be employed by means of spraying. The sprayed metal adheres to the surface of the rubber-like material and is more abrasion-resistant.

It should, however, be fully understood that we can create the rubber-like cover in such a way that for the last dippings we may employ the rubber-like material with less plasticizer, thus creating the latter layers fairly abrasion-proof.

The soft rubber-like material which forms, for instance, a bed for the wires might have a tendency to migrate to the rubber-like material having less plasticizer. In order to prevent this migration of the plasticizer we dip the coated rubber-like material in a suitable solution such as ethyl cellulose or Bakelite phenolic varnish in alcohol which creates an insoluble coating. The prevention of the migration of the plasticizer keeps the soft rubber-like material around the wires and thus prevents a hardening action which might otherwise occur. The migration of the plasticizer from the soft material to the harder material would tend to cause the harder material to become soft. Thus, the hard material which bridges the spaces between the teeth 18 for closing the spaces is kept relatively hard since the plasticizer in the rubber-like material around the wires cannot migrate thereto.

In inserting the wires in the slot, spacers of rubber-like material may be employed between the different windings which overlap around the end of the core. Such a spacer is illustrated by the reference character 50 shown in Figure 9. This spacer 50 may be of soft rubber-like material having a plasticizer therein and we prefer to dip this spacer in the above mentioned non-migrating solution to keep the soft rubber-like material from flowing to the regions where there is less plasticizer.

During the dipping procedure a layer of some material such as powdered mica, asbestos, or other suitable substance may be interposed between the successive layers. This has the advantage of "roughening" the surface of the superimposed layers, resulting in an increase of the mechanical reinforcement. This serves to distribute the mechanical shock and also aids in heat conduction as well as heat resistance.

The mica, asbestos, or other filling material may be deposited on the layer of plastic by suspending said material in the solvent which was described for use in binding the Vinylite-like plastics. This suspension will be applied to surfaces of the plastic already built up, allowed to partially dry, and then the next layer of plastic will be superimposed by the usual dipping procedure.

As both mica and asbestos are good electrically, but have different effects on the mechanical strength, plasticity and water-resistance of the plastic in which they are embedded, some combination of these two ingredients would be most desirable in some cases.

Different locations of placing the film of this filling material could be used, and inasmuch as the roughening of the surfaces in the places of contact between the wires of the windings is undesirable, we prefer to deposit the film containing these ingredients on the outer part of the insulation envelope or in the middle of the insulation wall.

Figure 3 pictures the lamination core completed and sprayed with the metallic protection 37 on the top and bottom heads of the coils. We prefer to create the metallic protection with zinc or lead, or other suitable metals. These metals could also be deposited by electro-galvanizing. Beside protecting the rubber-like material against the corrosive action of the water, the metal coating 37 keeps the rubber-like material from flowing or running in the event that the motor becomes temporarily overloaded or overheated which would tend to soften the rubber-like material.

The rubber-like envelope covering the whole winding element and stator is somewhat elastic and permits the lamination core to expand and contract eliminating the free space between the covers of the tops and bottom parts of the windings and the laminations.

The covering of the top and bottom of the coils with rubber-like insulation, even on the undercuts and on the irregular shaped windings would be deposited in a very thin section, thus having desirable dielectric strengths, and radiating the heat very readily.

The conventional wedges, slot lamination sheets, and the winding separators are completely eliminated so that a homogeneous insulation mass is achieved, preventing the creation of different heat spheres and causing disturbances in the dynamo-electric machines. The penetration of the rubber-like insulation between the individual wires in the slots as well as on the top and bottom heads of the windings is perfect. The walls between the individual wires are reinforced, thus making the insulation desirable for the higher voltage machines.

The ducts between the teeth of the lamination core are covered against abrasion with metallic spray 37 thus preventing wear. The bottom and top covers of the coils are protected with the same metallic spray 37, thus preventing the coils from injury. The leads and the cable are imbedded in the same insulation and then protected by metallic spray.

The rubber-like insulation forms a very soft bed for the individual wires, the outer portion of the coating being harder than the inner portion so that as a result, the wires are protected against mechanical injuries. Furthermore, the rubber-like insulation cover permits expansion and contraction of the core and the wires resulting from different temperatures, and consequently no cracking occurs. The entire coating completely envelopes the windings and the laminations which makes it water-tight and particular stress is made of the fact that the coating extends between the teeth to form a rubber-like bridge therebetween to keep the windings completely protected against moisture and water. The rubber-like bridges between the teeth may be provided with a groove 36 as indicated so that the ends of the teeth are substantially exposed to give an increasing radiation for dissipating the head generated in the teeth and the windings. The metal coating 37 which is sprayed over the outside of the rubber-like coating as illustrated in Figure 3 adheres to the rubber-like material which forms a good bond therebetween. The metal coating 37 stands a considerable amount of mechanical abuse and abrasive wear which further protects the rubber-like material and especially prevents the erosion of the rubber-like material in the ducts 36, see Figure 7. Tests show that the grooves greatly increase the output of a motor embodying our stator in some cases as much as substantially 55%.

In our invention the coating 11 covers the entire stator construction and the portion of the coating which covers the end of the laminated core forms anchoring portions 51, see Figures 1, 3 and 9, to which the rubber-like material which envelopes the coil heads may adhere to form a good bond to make the windings water-tight. Inasmuch as the rubber-like material is somewhat elastic, the bond between the rubber-like material which envelopes the coil heads and the anchoring portions on the end of the core does not crack or otherwise allow water, moisture and other foreign constituents to pass therethrough. The anchoring portions 51 relate particularly to the surface on the end of the core which lies within the immediate marginal region of the slots.

Although we have described our invention with a certain degree of particularity, it is understood that the present disclosure has been made only by way of example and the numerous changes in the details of construction and the combination and arrangement of parts may be resorted to without departing from the spirit and the scope of the invention as hereinafter claimed.

We claim as our invention:

1. In a dynamoelectric machine having a magnetizable core of laminated sheets with a plurality of teeth and winding slots extending from one end of the core to the other, the provision of a skin coating of fluid tight resilient rubber material covering the surface of the slots and forming sleeves, a winding comprising coils with coil sides in said slots and coil heads at the end of the core, a filling and cover coating of fluid tight insulating resilient rubber material in combination with the said skin coating sleeves enveloping the windings and forming a fluid tight casing thereabout, the material forming said filling and cover coating of the fluid tight casing bridging the space between said teeth and having longitudinal grooves therein extending longitudinally between said teeth, whereby cooling fluid may circulate through said grooves.

2. In a dynamoelectric machine having a magnetizable core of laminated sheets with a plurality of teeth and winding slots extending from one end of the core to the other, pliable and resilient rubber insulating layers between said laminated sheets in fluid tight relationship therewith, the provision of a skin coating of stretchably resilient fluid tight rubber material covering the surface of the slots and forming sleeves, a winding comprising coils with coil sides in said slots and coil heads at the end of the core, a filling and cover coating of fluid tight rubber insulating material in combination with the said skin coating sleeves enveloping the windings and forming a fluid tight casing thereabout, said casing and sleeves being anchored to said layers between the laminated sheets, the material forming said filling and cover coating of the fluid tight casing bridging the space between said teeth and having longitudinal grooves therein extending longitudinally between said teeth, whereby cooling fluid may circulate through said grooves.

3. In a dynamoelectric machine having a magnetizable core of laminated sheets with a plurality of teeth and winding slots extending from one end of the core to the other, pliable and resilient insulating layers between said laminated sheets in fluid tight relationship therewith, the provision of a skin coating of stretchably resilient fluid tight material covering the surface of the slots and forming sleeves, a winding comprising coils with coil sides in said slots and coil heads at the end of the core, a filling and cover coating of fluid tight insulating material in combination with the said skin coating sleeves enveloping the windings and forming a fluid tight casing thereabout, said casing and sleeves being anchored to said layers between the laminated sheets, the material forming said filling and cover coating of the fluid tight casing bridging the space between said teeth and having longitudinal grooves therein extending longitudinally between said teeth, the material which bridges the space between the teeth as well as the longitudinal grooves therein being surfaced with a protective wear resisting metal, whereby wear of cooling fluid circulating through said grooves will be reduced.

FRANK J. SIGMUND.
WILLIAM S. HLAVIN.

REFERENCES CITED

The following references are of record in the file of this patent:

UNITED STATES PATENTS

| Number | Name | Date |
|---|---|---|
| 464,026 | Kammeyer | Dec. 1, 1891 |
| 1,315,936 | Apple | Sept. 16, 1919 |
| 1,416,256 | Borger | May 16, 1922 |
| 1,678,380 | Cooper | July 24, 1928 |
| 1,748,242 | Papst | Feb. 25, 1930 |
| 2,252,440 | Safford | Aug. 12, 1941 |
| 1,839,299 | Cornu | Jan. 5, 1932 |
| 2,116,318 | Miles | May 3, 1938 |
| 2,124,610 | Dolgoff | July 26, 1938 |
| 2,128,544 | Surjaninoff | Aug. 30, 1938 |

FOREIGN PATENTS

| Number | Country | Date |
|---|---|---|
| 451,776 | Great Britain | Aug. 11, 1936 |

OTHER REFERENCES

The Dynamo, vol. 1., 1, by C. C. Hawkins, 6th edition, published by Sir Isaac Pitman & Sons, 1922, pages 327 and 328. (Copy in Div. 26.)